(12) United States Patent
Shiang et al.

(10) Patent No.: US 10,065,075 B2
(45) Date of Patent: Sep. 4, 2018

(54) DYNAMIC TIRE PRESSURE SENSOR SYSTEM FOR A BIKE

(71) Applicant: National Taiwan Normal University, Taipei (TW)

(72) Inventors: Tzyy-Yuang Shiang, Taipei (TW); Yin-Shin Lee, Taipei (TW); Chen-Fang Hsieh, Taipei (TW)

(73) Assignee: NATIONAL TAIWAN NORMAL UNIVERSITY, Taipei (TW)

( * ) Notice: Subject to any disclaimer, the term of this patent is extended or adjusted under 35 U.S.C. 154(b) by 68 days.

(21) Appl. No.: 15/177,148

(22) Filed: Jun. 8, 2016

(65) Prior Publication Data

US 2017/0197112 A1 Jul. 13, 2017

(30) Foreign Application Priority Data

Jan. 8, 2016 (TW) .............................. 105100498 A

(51) Int. Cl.
| | |
|---|---|
| *G01L 17/00* | (2006.01) |
| *B60C 23/04* | (2006.01) |
| *A63B 24/00* | (2006.01) |
| *G01L 5/00* | (2006.01) |
| *A63B 69/16* | (2006.01) |
| *B62J 99/00* | (2009.01) |

(52) U.S. Cl.
CPC .......... *A63B 24/0062* (2013.01); *B60C 23/04* (2013.01); *B60C 23/0474* (2013.01); *B60C 23/0479* (2013.01); *G01L 5/00* (2013.01); *G01L 17/00* (2013.01); *A63B 69/16* (2013.01); *B62J 2099/002* (2013.01)

(58) Field of Classification Search
None
See application file for complete search history.

(56) References Cited

U.S. PATENT DOCUMENTS

| | | | | |
|---|---|---|---|---|
| 4,423,630 | A * | 1/1984 | Morrison | A61B 5/221 340/323 R |
| 5,992,553 | A * | 11/1999 | Morrison | B62M 6/45 180/206.2 |
| 9,150,279 | B2 * | 10/2015 | Gros | B62M 6/50 |
| 9,447,869 | B2 * | 9/2016 | Tetsuka | F16H 61/0213 |
| 9,656,672 | B2 * | 5/2017 | Schieffelin | B62M 9/122 |
| 2016/0243927 | A1 * | 8/2016 | Biderman | B60K 7/0007 |
| 2016/0375308 | A1 * | 12/2016 | Anderson | A63B 24/0087 482/5 |
| 2017/0225742 | A1 * | 8/2017 | Hancock | B62M 11/14 |

\* cited by examiner

*Primary Examiner* — Peter Macchiarolo
*Assistant Examiner* — Jermaine Jenkins
(74) *Attorney, Agent, or Firm* — WPAT, PC

(57) ABSTRACT

A dynamic tire pressure sensor system for a bike comprises a dynamic tire pressure sensor device and a user receiving carrier wherein the dynamic tire pressure sensor device comprises at least a tire pressure sensor module, a processing module and a transmission module: the tire pressure sensor module transmits tire pressure change data to the processing module; the processing module either performs data operation independently or transmits tire pressure change data to the user receiving carrier from the transmission module for data operation in order to analyze pedaling cadences and pedaling forces during cycling and provide/display real-time sports information on the user receiving carrier.

12 Claims, 7 Drawing Sheets

DYNAMIC TIRE PRESSURE SENSOR SYSTEM FOR A BIKE

BACKGROUND OF THE INVENTION

1. Field of the Invention

The present disclosure relates to a dynamic tire pressure sensor system for a bike, particularly a dynamic tire pressure sensor system installed inside or on a bike's tire for analysis of real-time sports information during cycling and display of sports information on a user receiving carrier.

2. Description of Related Art

To measure pedaling forces or pedaling cadences, a sensor, which is installed on a major component within a bike frame such as pedal, bottom bracket shell, chain wheel, hub or crank, relies on a strain gauge or a piezoelectric transducer to measure pedaling forces directly or a torque transducer to estimate pedaling forces indirectly. However, an existing sensor which is not only manufactured uneasily but also installed difficultly is unavailable to all models of bikes and defective in voltage output controlled inconveniently.

From the viewpoint for mechanical running conditions, a crank will be an ideal and effective part with forces applied over 360 degrees. Moreover, the human being who is different from a machine is effective in and familiar with exercising leg muscles to pedal forward or downward. However, a person who is not used to pedaling backward or upward could feel tired usually. Against this background, a person who is trained effectively will perform well in pedaling exercises by applying different pedaling forces in all directions.

For example, the tangential pedaling force applied on a crank which is being rotated at the three o'clock position (90 degrees) is perpendicular to the ground and mostly effective. Comparatively, the tangential pedaling force is difficultly applied on a crank which is being rotated at the nine o'clock position (270 degrees) and a negative effect is culminated due to a cyclist's leg weight. For efficiency of pedaling, the point for application of maximum force should be around the three o'clock position; however, a cyclist's leg may not exercise smoothly while pedaling at the nine o'clock position. Efficiency of pedaling is affected by the above two factors.

As previously mentioned, the measured pedaling forces and rates based on sensor detection techniques directly are influenced by manmade factors. Moreover, the existing sensors for detection of pedaling forces and pedaling cadences are not universal components with drawbacks such as installation difficulty and voltage output uneasily controlled and need to be corrected by people skilled in the art.

Therefore, a dynamic tire pressure sensor device installed inside or on a tire comprises a tire pressure sensor module which replaces multiple sensors such as pedaling rate meter and dynamometer for less expending of a customer, lowered weight of a bike, and no exterior of a bike frame disfigured. As such, a dynamic tire pressure sensor system for a bike could be a preferred solution.

SUMMARY OF THE INVENTION

The present disclosure relates to a dynamic tire pressure sensor system for a bike which is installed inside or on a tire of any type of bike and features high-frequency data acquisition for real-time analyses of pedaling cadences during cycling and display of calculated results as real-time sports information on a user receiving carrier.

The present disclosure relates to a dynamic tire pressure sensor system for a bike which is characteristic of other advantages such as large-range measurement of pedaling forces applied by both feet, easy installation on various models of bikes, and lightweight sensor.

A dynamic tire pressure sensor system for a bike comprises: a dynamic tire pressure sensor device installed inside or on a bike's tire and comprising at least a tire pressure sensor module for detection of tire pressure change data with at least wave patterns of tire pressures in a period of time on a bike; a processing module, which is electrically connected to and controls running of the tire pressure sensor module transmitting tire pressure change data to the processing module and depends on the tire pressure change data to calculate pedaling cadences and pedaling forces of a running bike by analyzing tire pressure peaks among wave patterns of tire pressures; a transmission module, which is electrically connected to the processing module for transmission of calculated results from the processing module; and a user receiving carrier, which receives calculated results from the transmission module and displays calculated results as real-time sports information.

Specifically, the processing module further comprises a pedaling cadence analysis unit, which retrieves a duration between at least two tire pressure peaks among wave patterns of tire pressures in a period of time for calculation of a bike's pedaling cadences.

Specifically, the processing module further comprises a pedaling force analysis unit, which retrieves magnitudes of tire pressure peaks among wave patterns of tire pressures in a period of time for calculation of pedaling forces applied by a cyclist.

Specifically, the user receiving carrier could be a handheld intelligent device in which an application program is installed for reception of calculated results from the transmission module and display of calculated results as real-time sports information.

A dynamic tire pressure sensor system for a bike comprises: a dynamic tire pressure sensor device installed inside a bike's tire and comprising at least a tire pressure sensor module for detection of tire pressure change data with at least wave patterns of tire pressures in a period of time; a processing module, which is electrically connected to and controls running of the tire pressure sensor module transmitting tire pressure change data to the processing module; a transmission module, which is electrically connected to the processing module for transmission of tire pressure change data received from the processing module; and a user receiving carrier, which displays/provides real-time sports information, receive tire pressure change data from the transmission module, and relies on the tire pressure change data to calculate pedaling cadences and pedaling forces of a running bike by analyzing tire pressure peaks among wave patterns of tire pressures.

Specifically, the user receiving carrier could be a handheld intelligent device in which an application program is installed for reception of tire pressure change data from the transmission module, data operation based on the tire pressure change data, and display of real-time sports information such as pedaling cadences and pedaling forces.

Specifically, the application program further comprises a pedaling cadence analysis unit, which retrieves a duration between at least two tire pressure peaks among wave patterns of tire pressures in a period of time for calculation of a bike's pedaling cadences.

Specifically, the application program further comprises a pedaling force analysis unit, which retrieves magnitudes of tire pressure peaks among wave patterns of tire pressures in a period of time for calculation of pedaling forces applied by a cyclist.

DETAILED DESCRIPTION OF THE PREFERRED EMBODIMENTS

The technical contents, features and effects related to a dynamic tire pressure sensor system for a bike are clearly presented in preferred embodiments and accompanying drawings.

Figure 1:
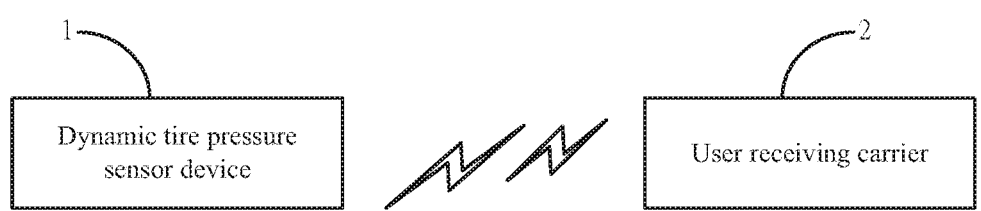
FIG. 1 is a schematic view for overall architecture of a dynamic tire pressure sensor system for a bike.
Figure 2:
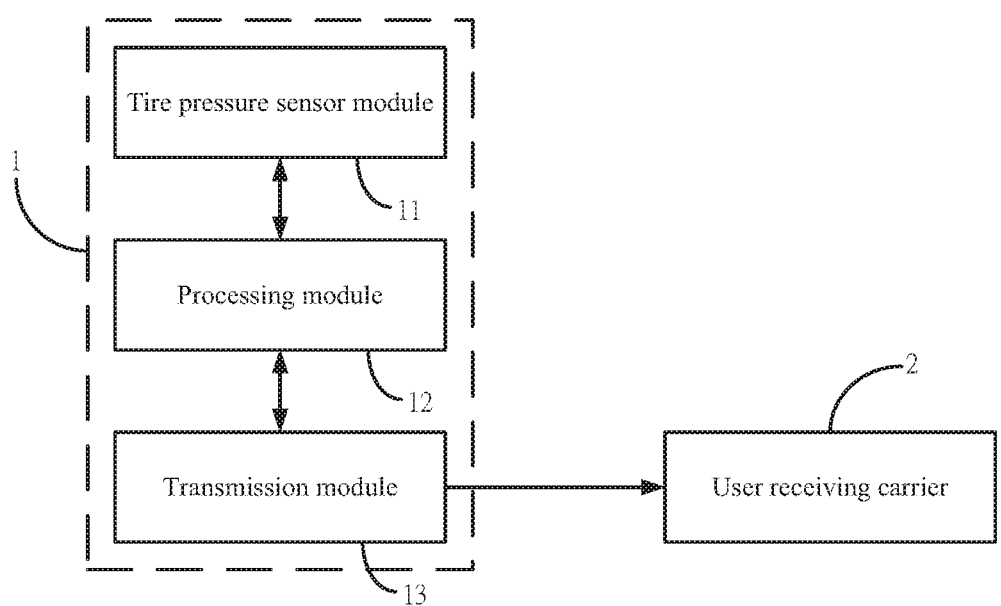
FIG. 2 is a schematic view for internal architecture of a dynamic tire pressure sensor device in a dynamic tire pressure sensor system for a bike.
Figure 3:
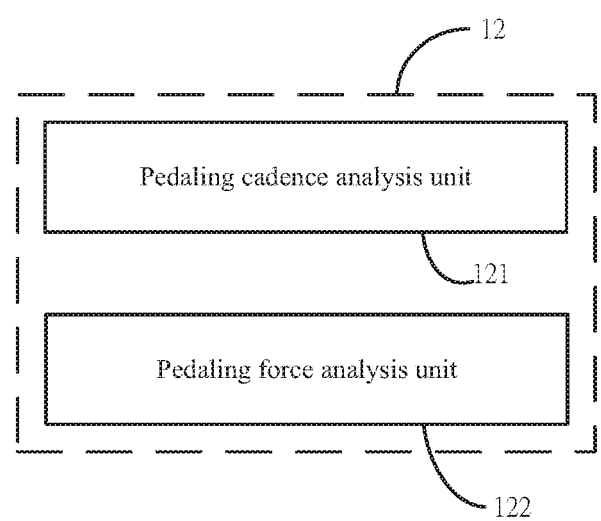
FIG. 3 is a schematic view for internal architecture of a processing module in a dynamic tire pressure sensor device of a dynamic tire pressure sensor system for a bike.

Referring to FIG. 1, FIG. 2 and FIG. 3, which are a schematic view for overall architecture of a dynamic tire pressure sensor system for a bike, a schematic view for internal architecture of a dynamic tire pressure sensor device, and a schematic view for internal architecture of a processing module, respectively. As shown in FIG. 1 to FIG. 3, a dynamic tire pressure sensor system for a bike comprises a dynamic tire pressure sensor device 1 and a user receiving carrier 2 wherein the dynamic tire pressure sensor device 1 comprises at least a tire pressure sensor module 11 for detecting a bike's tire pressure change data with at least wave patterns of tire pressures in a period of time, a processing module 12, and a transmission module 13.

The processing module 12 is electrically connected to and controls running of the tire pressure sensor module 11, which transmits tire pressure change data to the processing module 12; the processing module 12, which further comprises a pedaling cadence analysis unit 121 and a pedaling force analysis unit 122, is capable of calculating pedaling cadences and pedaling forces of a running bike by the tire pressure change data.

The pedaling cadence analysis unit 121 is able to retrieve a duration between at least two tire pressure peaks among wave patterns of tire pressures in a period of time for calculation of a bike's pedaling cadences; the pedaling force analysis unit 122 is able to retrieve magnitudes of tire pressure peaks among wave patterns of tire pressures in a period of time for calculation of pedaling forces applied by a cyclist.

The processing module 12 transmits calculated pedaling cadences and pedaling forces to a user receiving carrier 2 on which real-time sports information is displayed via the transmission module 13.

Figure 4:
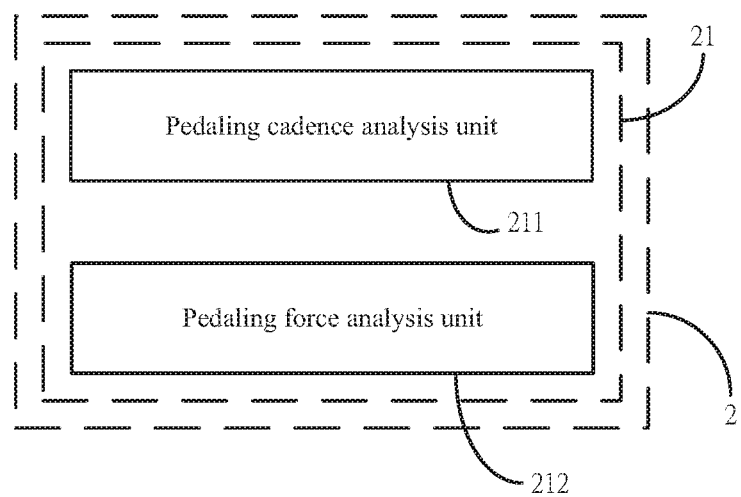
FIG. 4 is a schematic view for internal architecture of a user receiving carrier in a dynamic tire pressure sensor device of a dynamic tire pressure sensor system for a bike in another embodiment.

The user receiving carrier 2 could be a hand-held intelligent device in which an application program 21 is installed for supply and display of real-time sports information. Alternatively, as shown in FIG. 4, the application program 21 is provided with a pedaling cadence analysis unit 211 and a pedaling force analysis unit 212, both of which run as the pedaling cadence analysis unit 121 and the pedaling force analysis unit 122 and are not explained herein.

For both the processing module 12 and the application program 21 with capabilities to calculate pedaling cadences and pedaling forces, the processing module 12 will either compute pedaling cadences and pedaling forces independently or transmit tire pressure change data to the application program 21 in which pedaling cadences and pedaling forces are calculated.

For the processing module 12 with capabilities to calculate pedaling cadences and pedaling forces only, pedaling cadences and pedaling forces are calculated by the processing module 12 independently and transmitted to the application program 21.

For the application program 21 with capabilities to calculate pedaling cadences and pedaling forces only, tire pressure change data is transmitted to the application program 21 by the processing module 12 for calculation of pedaling cadences and pedaling forces in the application program 21.

Figure 5:
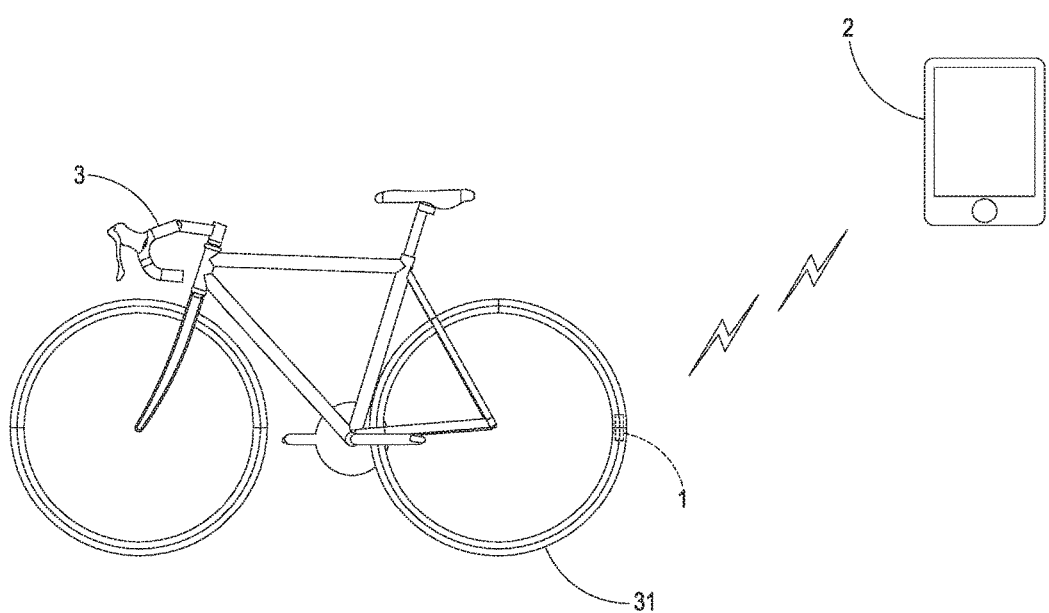
FIG. 5 is a schematic view for an application of a dynamic tire pressure sensor device in a dynamic tire pressure sensor system for a bike.
Figure 6A:
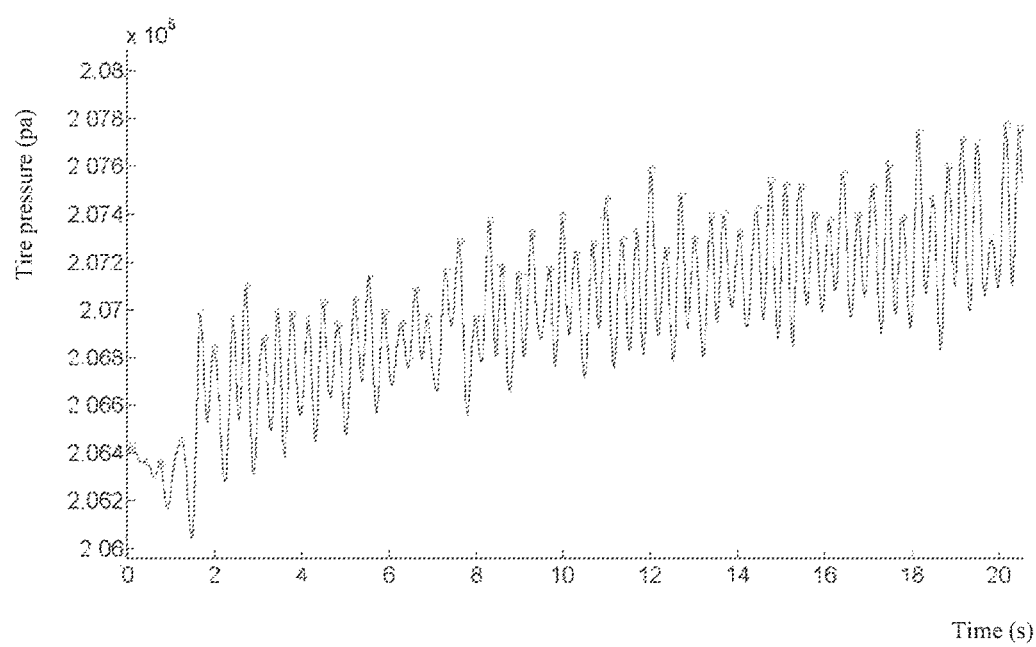
FIG. 6A is a schematic view for wave patterns of tire pressures from a dynamic tire pressure sensor device in a dynamic tire pressure sensor system for a bike.

As shown in FIG. 5, the dynamic tire pressure sensor device 1 which is installed inside or on a tire 31 of a bike 3 is able to detect tire pressure change data with at least wave patterns of tire pressures in a period of time, as shown in FIG. 6A (due to instantaneous pressure rise (relief) of a tire 31, which contacts the ground and is (is not) kept in compressed status briefly).

Figure 6B:
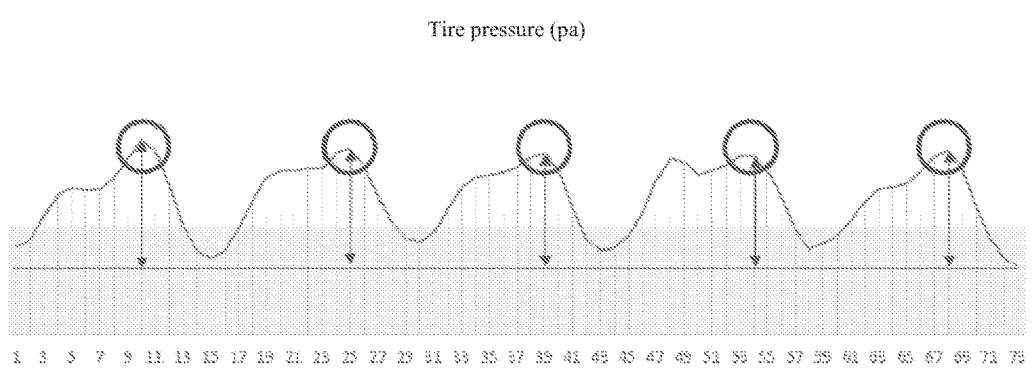
FIG. 6B is a schematic view for analyses of tire pressures through a dynamic tire pressure sensor device in a dynamic tire pressure sensor system for a bike.

FIG. 6A illustrates a plurality of tire pressure peaks; FIG. 6B illustrates magnitudes of tire pressure peaks in detail with the wave patterns of tire pressures enlarged wherein a tire pressure peak implies a cyclist pedals once, Pt is the duration between two tire pressure peaks, and CAD is the pedaling cadence according to the equation of CAD=30× (1÷Pt) (unit: RPM; 30: the unit conversion coefficient for turns per second transferred to turns per minute).

With a single (maximum) tire pressure peak corresponding to a unique pressure value (Pa), all tire pressure peaks among wave patterns of tire pressures in a period of time match distinct magnitudes of pressures (Pa) which constitute a foundation of calculating pedaling forces applied by a cyclist on a bike according to the equation of F=k×ΔP+R (F: pedaling force; k: correction coefficient (unit: N/Pa); ΔP: tire pressure change (maximum tire pressure (the magnitude of pressure at a single tire pressure peak in a period of time)−mean tire pressure (the mean value of all tire pressure peaks in a period of time)); R: correction coefficient).

In contrast to other conventional techniques, a dynamic tire pressure sensor system for a bike in the present disclosure has advantages as follows:

(1) A dynamic tire pressure sensor device installed inside or on a tire comprises a tire pressure sensor module for creation of a bike's speeds based on integration of multiple parameters, replacing various sensors such as pedaling rate meter and dynamometer for less expending of a customer, lowered weight of a bike, and no exterior of a bike frame disfigured.

(2) A dynamic tire pressure sensor system which can be installed inside or on a tire of any type of bike features high-frequency data acquisition for real-time analyses and computation of pedaling cadences during cycling based on wave pattern changes (wave amplitude changes) and display of calculated results as real-time sports information on a user receiving carrier.

(3) A dynamic tire pressure sensor system for a bike is characteristic of other advantages such as large-range measurement of pedaling forces applied by both feet, easy installation on various types of bikes, lightweight sensor, and no calibration of power-on voltage required.

The preferred embodiments hereof should not be taken as examples to restrict the scope of a dynamic tire pressure sensor system for a bike in the present disclosure. The partial changes and modifications made by the skilled persons who familiarizes themselves with the above technical features and embodiments without departing from the spirit and scope of the present disclosure should be covered in claims of the patent specification.

What is claimed is:

1. A dynamic tire pressure sensor system for a bike, comprising:
    a dynamic tire pressure sensor device, installed inside or on a bike's tire, comprising:
        a tire pressure sensor module, for detection of tire pressure change data comprising wave patterns of tire pressures in a period of time;
        a processing module, which is electrically connected to and controls the tire pressure sensor module to transmit tire pressure change data to the processing module, and calculates pedaling cadences and pedaling forces as calculated results of a running bike from the tire pressure change data by analyzing tire pressure peaks among the wave patterns of tire pressures; and
        a transmission module, which is electrically connected to the processing module, for transmission of the calculated results from the processing module; and
    a user receiving carrier, which receives the calculated results from the transmission module and displays the calculated results as real-time sports information.

2. The dynamic tire pressure sensor system for a bike as claimed in claim 1, wherein the processing module comprises a pedaling cadence analysis unit, which retrieves a duration between at least two tire pressure peaks among the wave patterns of tire pressures in a period of time for the calculation of the pedaling cadences.

3. The dynamic tire pressure sensor system for a bike as claimed in claim 1, wherein the processing module comprises a pedaling force analysis unit, which retrieves magnitudes of tire pressure peaks among the wave patterns of tire pressures in a period of time for the calculation of pedaling forces.

4. The dynamic tire pressure sensor system for a bike as claimed in claim 1, wherein the user receiving carrier is a hand-held intelligent device in which an application program is installed for reception of the calculated results from the transmission module and display of the calculated results as real-time sports information.

5. A dynamic tire pressure sensor system for a bike, comprising:
    a dynamic tire pressure sensor device, installed inside or on a bike's tire, comprising:
        a tire pressure sensor module, for detection of tire pressure change data comprising wave patterns of tire pressures in a period of time;
        a processing module, which is electrically connected to and controls the tire pressure sensor module to transmit tire pressure change data to the processing module; and
        a transmission module, which is electrically connected to the processing module, for transmission of the tire pressure change data received from the processing module; and
    a user receiving carrier, which receives the tire pressure change data from the transmission module, calculates pedaling cadences and pedaling forces of a running bike from the tire pressure change data by analyzing tire pressure peaks among the wave patterns of tire pressures and displays or provides the pedaling cadences and pedaling forces as real-time sports information.

6. The dynamic tire pressure sensor system for a bike as claimed in claim 5, wherein the user receiving carrier is a hand-held intelligent device in which an application program is installed for reception of the tire pressure change data from the transmission module, calculation of pedaling cadences and pedaling forces based on the tire pressure change data, and display of the pedaling cadences and pedaling forces as real-time sports information.

7. The dynamic tire pressure sensor system for a bike as claimed in claim 6, wherein the application program comprises a pedaling cadence analysis unit, which retrieves a duration between at least two tire pressure peaks among the wave patterns of tire pressures in a period of time for the calculation of pedaling cadences.

8. The dynamic tire pressure sensor system for a bike as claimed in claim 6, wherein the application program comprises a pedaling force analysis unit, which retrieves magnitudes of tire pressure peaks among the wave patterns of tire pressures in a period of time for the calculation of pedaling forces.

9. The dynamic tire pressure sensor system for a bike as claimed in claim 2, wherein the pedaling cadence analysis unit performs the calculation of pedaling cadences according to $CAD=30\times(1\div Pt)$, wherein CAD is the pedaling cadence in RPM and Pt is the duration between two tire pressure peaks.

10. The dynamic tire pressure sensor system for a bike as claimed in claim 7, wherein the pedaling cadence analysis unit performs the calculation of pedaling cadences according to $CAD=30\times(1\div Pt)$, wherein CAD is the pedaling cadence in RPM and Pt is the duration between two tire pressure peaks.

11. The dynamic tire pressure sensor system for a bike as claimed in claim 3, wherein the pedaling force analysis unit performs the calculation of pedaling forces according to $F=K\times\Delta P+R$, wherein F is the pedaling force, K is a first correction coefficient, $\Delta P$ is the difference between a peak tire pressure in a given period of time and a mean tire pressure during the given period of time, and R is a second correction coefficient.

12. The dynamic tire pressure sensor system for a bike as claimed in claim 8, wherein the pedaling force analysis unit performs the calculation of pedaling forces according to $F=K\times\Delta P+R$, wherein F is the pedaling force, K is a first correction coefficient, $\Delta P$ is the difference between a peak tire pressure in a given period of time and a mean tire pressure during the given period of time, and R is a second correction coefficient.

* * * * *